(12) United States Patent
Maricevic et al.

(10) Patent No.: US 10,129,616 B2
(45) Date of Patent: Nov. 13, 2018

(54) SEAMLESS BANDWIDTH GROWTH WITH RFOG

(71) Applicant: ARRIS Enterprises, Inc., Suwanee, GA (US)

(72) Inventors: Zoran Maricevic, West Hartford, CT (US); Marcel F. Schemmann, Maria Hoop (NL); John Ulm, Pepperell, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/676,914

(22) Filed: Apr. 2, 2015

(65) Prior Publication Data
US 2015/0304744 A1   Oct. 22, 2015

Related U.S. Application Data

(60) Provisional application No. 61/982,089, filed on Apr. 21, 2014, provisional application No. 61/984,303, (Continued)

(51) Int. Cl.
*H04J 14/00* (2006.01)
*H04Q 11/00* (2006.01)
(Continued)

(52) U.S. Cl.
CPC ..... *H04Q 11/0067* (2013.01); *H04B 10/2503* (2013.01); *H04B 10/2575* (2013.01); (Continued)

(58) Field of Classification Search
None
See application file for complete search history.

(56) References Cited

U.S. PATENT DOCUMENTS 4,941,208 A * 7/1990 Olshansky .......... H04J 14/0298
                                                              398/186
5,262,883 A   11/1993 Pidgeon
(Continued)

FOREIGN PATENT DOCUMENTS

EP        1235434 B1    10/2005
JP     2012249057 A *   12/2012
(Continued)

OTHER PUBLICATIONS

PCT International Search Report and Written Opinion for PCT/US2015/024096, dated Jun. 29, 2015.
(Continued)

*Primary Examiner* — Ken N Vanderpuye
*Assistant Examiner* — David Lambert
(74) *Attorney, Agent, or Firm* — Thomas A. Ward

(57) ABSTRACT

A radio frequency over glass (RFoG) system may be modified to extend a downstream band. A transimpedance amplifier with a downstream path may be used in the RFoG system in combination with an upstream path having greater than 200 MHz radio frequency (RF) bandwidth to provide the greater than 1.2 GHz downstream bandwidth overlapping with the greater than 200 MHz upstream bandwidth. The RFoG system may include a gateway facilitating an optical network unit and modem connection, the gateway having an express upstream port and an express downstream radio frequency (RF) port. The gateway may be configured for processing legacy RFoG signals in an upstream and a downstream direction and for at least one of generating or processing, via the express ports on the modem, RFoG signals in an extended spectrum beyond 42 MHz in the upstream direction and beyond 1000 MHz in the downstream direction.

23 Claims, 7 Drawing Sheets

Related U.S. Application Data filed on Apr. 25, 2014, provisional application No. 62/043,793, filed on Aug. 29, 2014.

(51) Int. Cl.
*H04B 10/25* (2013.01)
*H04B 10/2575* (2013.01)
*H04J 14/02* (2006.01)
*H04N 7/10* (2006.01)
*H04N 7/22* (2006.01)

(52) U.S. Cl.
CPC .... *H04B 10/25751* (2013.01); *H04J 14/0221* (2013.01); *H04N 7/104* (2013.01); *H04N 7/22* (2013.01)

(56) References Cited

U.S. PATENT DOCUMENTS

| | | | |
|---|---|---|---|
| 5,331,449 A | 7/1994 | Huber et al. | |
| 5,432,629 A * | 7/1995 | Shikada | H04B 10/572 372/28 |
| 5,914,799 A | 6/1999 | Tan | |
| 6,041,056 A | 3/2000 | Bigham et al. | |
| 7,941,022 B1 | 5/2011 | Schaffner et al. | |
| 8,837,953 B2 | 9/2014 | Mutalik et al. | |
| 2001/0030785 A1* | 10/2001 | Pangrac | H04N 7/22 398/72 |
| 2005/0265730 A1* | 12/2005 | Yasue | H04B 10/503 398/183 |
| 2010/0150566 A1* | 6/2010 | Soto | H04B 10/272 398/115 |
| 2010/0239251 A1* | 9/2010 | Biegert | H04Q 11/0067 398/58 |
| 2011/0158656 A1* | 6/2011 | Vieira | H04B 10/6911 398/202 |
| 2012/0106964 A1* | 5/2012 | Sniezko | H04B 10/25751 398/67 |
| 2012/0275792 A1* | 11/2012 | Nandiraju | H04L 12/2801 398/66 |
| 2013/0122834 A1* | 5/2013 | Cabrera | H03F 1/0277 455/114.3 |

FOREIGN PATENT DOCUMENTS

| | | |
|---|---|---|
| WO | 2010042231 A1 | 4/2010 |
| WO | 2010042232 A1 | 4/2010 |
| WO | 2012039758 A1 | 3/2012 |

OTHER PUBLICATIONS

"OBI free", retrieved from the Internet at <http://www.emc-web.com/J_emc/index.php?option=com_content&view=article&id=165:obi-free&catid=47:paper<emid=182\> on Mar. 24, 2015.

A. Tan, "Super PON-A Fiber to the Home Cable Network for CATV and POTS/ISDN/VOD as Economical as a Coaxial Cable Network", Journal of Lightwave Technology, vol. 15, No. 2, Feb. 1997, pp. 213-218.

"HRL Laboratories, LLC: About Us", retrieved from the Internet at <http://www.hrl.com/aboutUs/abt_main.html> on Mar. 24, 2015.

A. Al-Banna, et al., "Beat it! Handling Optical Beat Interference in RFOG Systems", ARRIS White Paper, ARRIS Enterprises, Inc., 2014, 31 pgs.

V. Mutalik, et al., "Partnership for Extended Capacity: DOCSIS 3.1 with RFoG", ARRIS White Paper, 2013, 18 pgs.

V. Mutalik, et al., "Partnership for Extended Capacity: DOCSIS 3.1 with RFoG", ARRIS PowerPoint Presentation, 2014 Spring Technical Forum, Apr. 30, 2014.

* cited by examiner

SEAMLESS BANDWIDTH GROWTH WITH RFOG

CROSS-REFERENCE TO RELATED APPLICATIONS

This application claims the benefit of priority under 35 U.S.C. § 119(e) to U.S. Provisional Application No. 61/982,089, filed on Apr. 21, 2014, U.S. Provisional Application No. 61/984,303, filed on Apr. 25, 2014, and U.S. Provisional Application No. 62/043,793, filed on Aug. 29, 2014, the entire disclosures of each incorporated herein by reference.

Also, this application is related to U.S. application Ser. No. 14/625,187 entitled "Active Optical Combiner for CATV Network" filed Feb. 18, 2015, the entire disclosures of each incorporated herein by reference.

BACKGROUND

Although Cable Television (CATV) networks originally delivered content to subscribers over large distances using an exclusively RF transmission system, modern CATV transmission systems have replaced much of the RF transmission path with a more effective optical network, creating a hybrid transmission system where cable content originates and terminates as RF signals over coaxial cables, but is converted to optical signals for transmission over the bulk of the intervening distance between the content provider and the subscriber. Specifically, CATV networks include a head end at the content provider for receiving RF signals representing many channels of content. The head end receives the respective RF content signals, multiplexes them using an RF combining network, converts the combined RF signal to an optical signal (typically by using the RF signal to modulate a laser) and outputs the optical signal to a fiber-optic network that communicates the signal to one or more nodes, each proximate a group of subscribers. The node then reverses the conversion process by de-multiplexing the received optical signal and converting it back to an RF signal so that it can be received by viewers.

Cable television (CATV) networks have continuously evolved since first being deployed as relatively simple systems that delivered video channels one-way from a content provider. Early systems included transmitters that assigned a number of CATV channels to separate frequency bands, each of approximately 6 MHz. Subsequent advancements permitted limited return communication from the subscribers back to the content provider through a dedicated, small low-frequency signal propagated onto the coaxial network. Modern CATV networks, however, provide for not only a much greater number of channels of content, but also provide data services (such as Internet access) that require much greater bandwidth to be assigned for both forward and return paths. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end.

Recent improvements in CATV architectures that provide further improvements in delivery of content include Fiber-to-the Premises (FTTP) architectures that replace the coaxial network between a node and a subscriber's home with a fiber-optic network with RF modulated optical signals. Such architectures are also called Radio Frequency over Glass (RFoG) architectures. A key benefit of RFoG is that it provides for faster connection speeds and more bandwidth than current coaxial transmission paths are capable of delivering. For example, a single copper coaxial pair conductor can carry six phone calls, while a single fiber pair can carry more than 2.5 million phone calls simultaneously. FTTP also allows consumers to bundle their communications services to receive telephone, video, audio, television, any other digital data products or services simultaneously.

Hybrid Fiber Coax (HFC) is commonly used for residential broadband data service delivery. HFC typically includes a coaxial cable connection in the last mile between the content delivery network and the customer premises. Passive Optical Networks with binary modulated instead of RF modulated optical signals are deployed to provide FTTP solutions. Even though PON networks send approximately 1 Gbps of data per service group in both directions, a typical PON architecture 'overlays' an HFC-modulation-type video wavelength to achieve larger downstream capacities. HFC is perceived as less capable than PON in the context of a total capacity for delivery of content, particularly in the upstream. Other "last mile access" technology that has limited upstream capabilities include a) legacy telephony twisted-wire infrastructure, exploited via DSL, ADSL and VADSL b) Wireless, of various kinds: Satelite for video and data, WiFi for data, LTE for data, voice, video and c) Fiber to the premises (FTTP), which has been successful for 'point to point' configurations, or for point-to-multipoint (P2MP) 'passive optical network' (PON) configurations for data, video and voice.

In an RFoG environment, where many of the physical limitations of the HFC cable plant do not exist, DOCSIS 3.1 could achieve significantly more capacity. A well thought out partnership of DOCSIS 3.1 and RFoG can satisfy the anticipated growth in traffic demand while providing MSOs with plant and equipment investment protection well into the future. Modifications to a traditional RFoG architecture may be introduced such that the attainable capacity is significantly more than anticipated for RF modulated signals and surpasses that of most binary modulated PON solutions.

Thus, improvements in the RFoG environment to increase capacity are desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
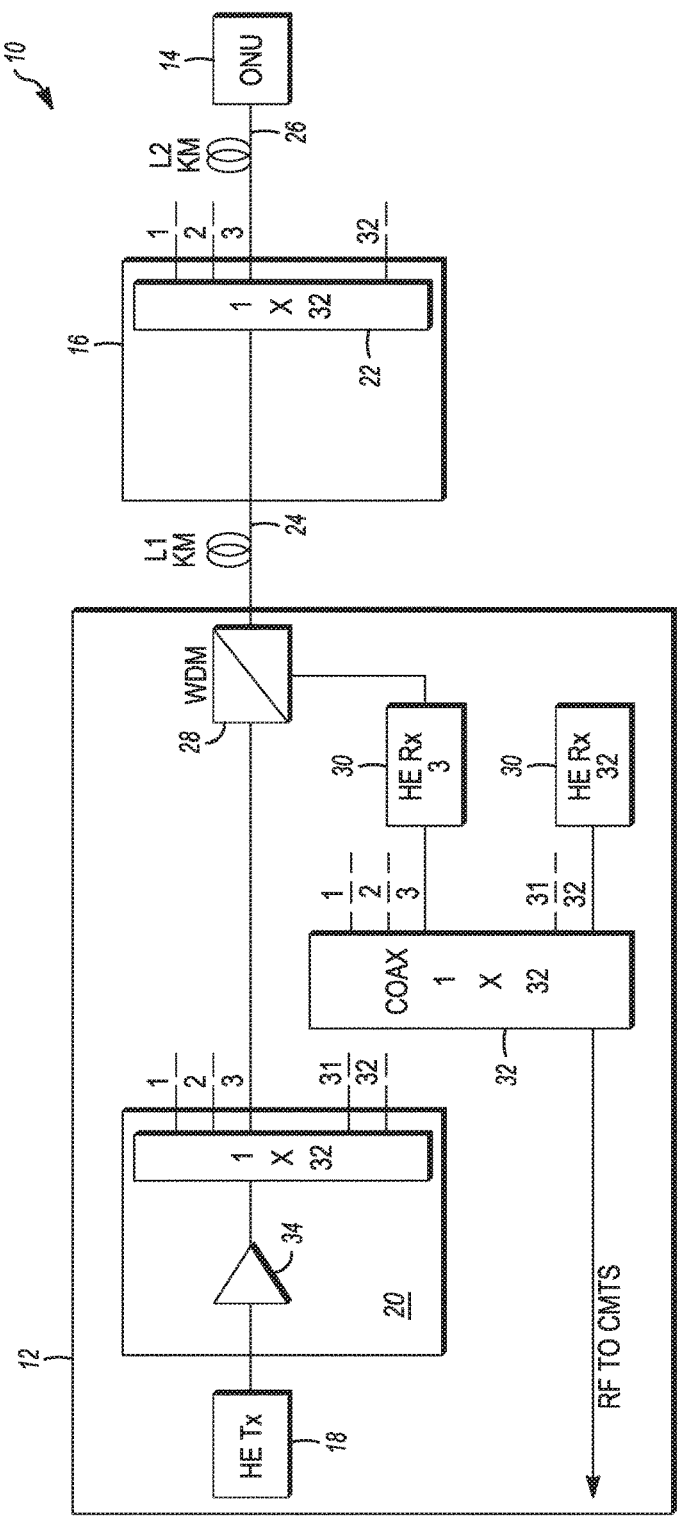
FIG. 1 depicts a radio frequency over glass (RFoG) architecture.

It is noted that while the accompanying Figures serve to illustrate embodiments of concepts that include the claimed invention, and explain various principles and advantages of those embodiments, the concepts displayed are not necessary to understand the embodiments of the present invention, as the details depicted in the Figures would be readily apparent to those of ordinary skill in the art having the benefit of the description herein.

DESCRIPTION

There are several contenders to supply the growth in data bandwidth over the next decades. MSOs consider an HFC split change or moving from HFC to FTTH. For example, a HFC is desirable, possibly with a split change, that can support >10 Gbs downstream and several 100 Mbs to Gbs upstream capacity. There are various PON variants, such as 10 GPON, there is point-point Ethernet, each of them optionally with an RF overlay to support the video demand. It is desirable for MSOs to further support existing HFC plant to extend the life of current investments and technology. RFoG promises a seamless integration with existing HFC plant and CPE and HE termination equipment currently being used. RFoG is often presented as a transitional technology that permits an easy transition to PON for the MSO.

However, 10 G PON is limited in its downstream capacity that does not exceed the capacity available with D3.1 on HFC. The limitations of a PON system will become more evident as data transmissions expand. Plain low-cost NRZ binary modulation formats cannot meet the demand at 25 km distance in the presence of high dispersion such that more complex PON systems such as systems with 4 10 Gbs wavelengths operating in parallel are now being envisioned.

For RFoG on the fiber, downstream and upstream are separate wavelengths. Symmetrical bandwidth is possible on the fiber part at approximately 1 GHz in each direction. However, the bandwidth is limited by the RF spectrum split on the in-home/business coax, a split that is hardwired in to the RFoG ONU. In some residential broadband data service delivery systems, there is a 42/54 MHz RF split; some countries use a 65/85 MHz split; other splits are possible, such as 85/105 MHz. The total data capacity in the upstream in a 42/54 MHz RF split system does not currently go beyond approximately 300 Mbps (calculated as bandwidth in MHz*bps/Hz, which is approximately 37 MHz*8 bps/Hz=300 Mbps). Even if extending this to so-called 'mid-split' of 85/102 MHz, the upstream capacity merely doubles, to about 600 Mbps, calculated as ~80 MHz*~8 bps/Hz=600 Mbps total.

As described herein, the data capacity for FFTH networks is expected to grow, at least to levels of 40 Gbs DS and 5-10 Gbs US. in HFC-style FTTP, that is also known as 'RFoG' i.e., 'RF modulation over Glass', fiber reaches the customer premise, and terminates in an RFoG 'ONU' (Optical Network Unit'. There is really no major drawback to changing the RF split ratio in such a network, because the DS and US signals travel over separate wavelengths over fiber, and as such do not interact with each other, even if the US is allowed to take the same BW range of the DS (Over RFoG, DS travels on 1550 nm, US travels on either 1310 or 1610 nm). It is desirable to modify existing FFTH networks already at this time to support data growth for years to come. Low cost PON systems with binary modulation formats are not expected to support bandwidth growth above 20 Gbs for 1550 nm systems on SMF with transmission distance of 25 km or greater.

Disclosed herein are embodiments for an RFoG system with an extended downstream band, including embodiments for control of modem transmit levels by a CMTS, application of FP lasers, and OBI control in mixed passive/active splitter systems. To increase RFoG capacity, embodiments may depend on existing deployments of RFoG.

Disclosed is an RFoG system that has an expanded downstream capacity. For example, existing 10G PON systems are unable to handle peak and average data traffic above 10 Gbs growth models that estimate a need for at least 30-40 Gbs for downstream traffic and a need for at least >5 Gbs upstream for upstream traffic capacity. The disclosed RFoG system provides a capacity for these target values, where embodiments disclosed have additional capacity in various implementations. The disclosed techniques may provide a more efficient use of the RF spectrum, which when used with RFoG technology and features available via the DOCSIS 3.1 standard—and combined with ONU designs using current technology—addresses the anticipated growth rates and bandwidth expansions seamlessly over the next decade and more.

Disclosed herein are embodiments for an RFoG ONU that support estimated traffic growth while remaining fully compatible with current HE and CPE equipment and installations made to date. Embodiments include 40 Gbs downstream (for instance 4.5 GHz RF), 10 Gbs upstream (1 GHz RF) RFoG technology that can be implemented with existing ONU technology. Implementations of the disclosed techniques may include modifications to existing architectures that are transparent while improving both modulation formats and bandwidth expansion.

Disclosed are embodiments in which the CMTS can control modem transmit levels. For example, in a 200 MHz RFoG return system, the CMTS may have to relinquish level control to the modem. In embodiments, such control is implemented directly next to the ONU as a gateway that retains an in-home 42/54 MHz split and 1 GHz coaxial network (and all modems and CPE that currently reside there), but may open up the rest of the return bandwidth for a high speed modem. The same high speed modem can also terminate the up-to 40 Gbs downstream services.

Disclosed are embodiments that include the application of FP lasers and OBI control in mixed passive/active splitter systems. For example, active splitters can be used for OBI free operation and improved SNR trading off higher splitter cost with lower ONU costs. An RFoG system with extended upstream bandwidth is also introduced and various implementations are discussed.

An RFoG system delivers cable services through a PON style FTTH network infrastructure. In telecommunications, radio frequency over glass (RFoG) is a deep-fiber network design in which the coax portion of the hybrid fiber coax (HFC) network is replaced by a single-fiber passive optical network (PON). The Society of Cable and Telecommunications Engineers (SCTE) has approved standards for implementing RFoG, also approved by the American National Standard Institute (ANSI).

An RFoG topology may include an all-fiber service from the headend to a field node or optical network unit (ONU), which is typically located at or near the user's premises. In a cable network headend, a downstream laser may send a broadcast signal that is optically split multiple times. The optical network unit, or ONU, recovers the RF broadcast signal and passes it into the subscriber's coax network. Downstream and return-path transmission use different wavelengths to share the same fiber (typically 1,550 nm downstream, and 1,310 nm or 1,590/1,610 nm upstream). The return-path wavelength standard is expected to be 1,610 nm, but early deployments have used 1,590 nm or 1310 nm. Using 1,590/1,610 nm for the return path allows the fiber infrastructure to support both RFoG and a standards-based PON simultaneously, operating with 1,490 nm downstream and 1,310 nm return-path wavelengths. Both RFoG and HFC systems can concurrently operate out of the same headend/hub, making RFoG a good solution for node-splitting and capacity increases on an existing network. Embodiments are described herein that are compatible with standards-based RFoG and PON systems, but it should be understood that other upstream and downstream wavelengths may be compatible with the disclosed techniques.

RFoG allows service providers to continue to leverage traditional HFC equipment and back-office applications with the new FTTP deployments. For example, cable operators can continue to rely on the existing provision and billing systems, Cable modem termination system (CMTS) platforms, headend equipment, set-top boxes, conditional access technology and cable modems while gaining benefits inherent with RFoG and FTTx.

FIG. 1 shows an exemplary RFoG system 10, where a head end 12 delivers content to an ONU 14 at a customer's premises through a node 16. An RFoG topology includes an all-fiber service from the headend 12 to a field node or optical network unit (ONU), which is typically located at or near the user's premises. In the headend 12, a downstream laser sends a broadcast signal that is optically split multiple times. The optical network unit 14, or ONU, recovers the RF broadcast signal and passes it into the subscriber's network, which may be coaxial or also upgraded with fiber communication.

The head end 12 may include a transmitter 18 that delivers a downstream signal to one or more 1×32 passive splitters 20 that includes 32 output ports, each output port connected to a wavelength division multiplexer (WDM) splitter 28 that delivers the downstream content over a fiber transmission segment 24 to the node 16. The node 16 may include another 1×32 splitter 22, where each output port of the splitter 22 is connected via another fiber segment 26 to a particular ONU 14 at a subscriber's premises.

Optical networking units (ONUs) in an RFoG environment may terminate the fiber connection at a subscriber-side interface and convert traffic for delivery over the in-home network at the customer premises. Coaxial cable can be used to connect the ONUs of an RFoG network to one or more user device, wherein the RFoG user devices can include cable modems, EMTAs, or set-top boxes, as with the user devices of an HFC network. For example, an R-ONU may connect to set-top boxes, cable modems, or like network elements via coaxial cable, and one or more of the cable modems may connect to the subscriber's internal telephone wiring and/or to personal computers or like devices via Ethernet or Wi-Fi connections.

Those of ordinary skill in the art will appreciate that the foregoing architecture is illustrative only. For example, the number of ports of the splitters 20 and 22 may be changed, as desired. It should also be understood that the head end 12 may include more splitters 20, each splitter having outputs connected to a respective node so as to serve a great number of subscribers.

Along the return path from the subscriber's ONU 14 to the head end, the splitter 22 operates as a combiner, i.e. for a 1×32 port splitter/combiner 22, up to 32 ONUs may deliver return path signals to the node 16, which combines them for upstream transmission along fiber length 24. Each of the signals from the respective ONU's 14 is then separated from other signals by the WDM 28 to be received by a separate receiver 30 in the head end 12. The signals from the respective receivers are then combined by a combiner 32 for transmission to a Cable Modem Termination Service (CMTS) in the head end 12. The signals are combined in the RF domain in the headend 12 by the combiner 32, before being connected to the CMTS upstream port. Combined with the forward power limit on the fiber, the combined signals may require one forward fiber 24 (L1 km) per group of 32 subscribers.

In the forward direction, the forward transmitter is provided to a higher power multi-port amplifier that distributes power. For example, in the head end 12, the transmitter 18 provides output to an Erbium Doped Fiber Amplifier (EDFA) 34 that internally distributes power over the 32 outputs of the combiner 20, each output operated at a relatively high power, e.g. approximately 18 decibel-milliwatts (dBm). The WDM 28 may transmit 1550 nm light from the EDFA 34 in the forward direction and direct reverse light, typically at 1610 nm or perhaps 1310 nm in the reverse direction to the receivers 30. The WDM 28 may be connected to a fiber of length L1 that feeds the splitter 22 in the node 16.

The outputs of the splitter 22 may each be provided to second fibers of length L2 that are respectively connected to ONUs 14 at the subscriber homes. In embodiments, L1+L2 may be up to 25 km. The ONUs 14 convert the forward transmitted light to RF signals for the in-home coaxial network. In the return direction, the ONUs 14 may also receive RF signals from the in-home network and modulate these signals onto a laser, operating at 1610 nm for example, and the laser's output is sent upstream into the fiber L2. The upstream signal may be combined with other upstream signals in the combiner 22 and transmitted further upstream in the fiber L1. At the WDM 28 the upstream signals are directed towards the head end receivers 30.

The loss budget for 32 subscribers and 25 km of fiber requires one receiver in the head end 12 for every group of 32 subscribers; given an upstream transmission power of 3 dBm, the receivers 30 and the WDM 28 may typically operate at a power between −18 and −21 dBm, making a good signal to noise ratio challenging, such that band limited receivers are usually required for acceptable performance. Furthermore, the optical combiner 22 may be passive and combine multiple optical inputs to a single output. Thus, by definition the optical combiner 22 may create OBI between these inputs, as described earlier and will therefore create noise in the RF domain at the head end receivers 30. Furthermore, assume a loss of around 24 dB in the forward path; for an EDFA output power of 18 dBm per port this provides −6 dBm power to the receivers. This is sufficient for acceptable performance at the ONU to 1 GHz, provided low noise high gain receivers are used.

In case the 32 subscribers can be received individually at the star splitter location (such as 22) then the input power to the receiver is high, almost as high as the return laser power since the links (26) to the star splitter are short. A high SNR is readily obtained and there is no OBI. The combined signal of all received signals must then be re-transmitted over the long (25 km) fiber link (24) and detected at the headend. At the headend multiple such return links need to be combined so a similar multiple input receiver design could be used instead of receivers 30 and RF combiner 32. The multiple input receivers may be designed such that the thermal noise figure does not depend on how many inputs are used such that combining of multiple sources is straightforward. However the thermal noise figure is higher than that of a regular receiver. This may be overcome by the higher receiver levels.

From a splitter that distributes light to subscribers and combines return light from the subscribers at a penalty, there can be a long link (e.g., up to 25 km with an additional 6 dB of loss) back to a headend or hub where the combined return sources are detected at a receiver. The total loss is high such that the receiver SNR is degraded. Furthermore, typically up to 8 receiver outputs are combined onto CMTS return port that thus handles around 256 subscribers. In this combining, the receiver thermal noise adds up and unless means are implemented on the receivers to turn them off in the absence of signal the SNR is degraded by a further 9 dB. Even with such means the SNR is still degraded by up to 6 dB when up to 4 return transmitters are on simultaneously, a valid operation mode of the return network.

Figure 2:
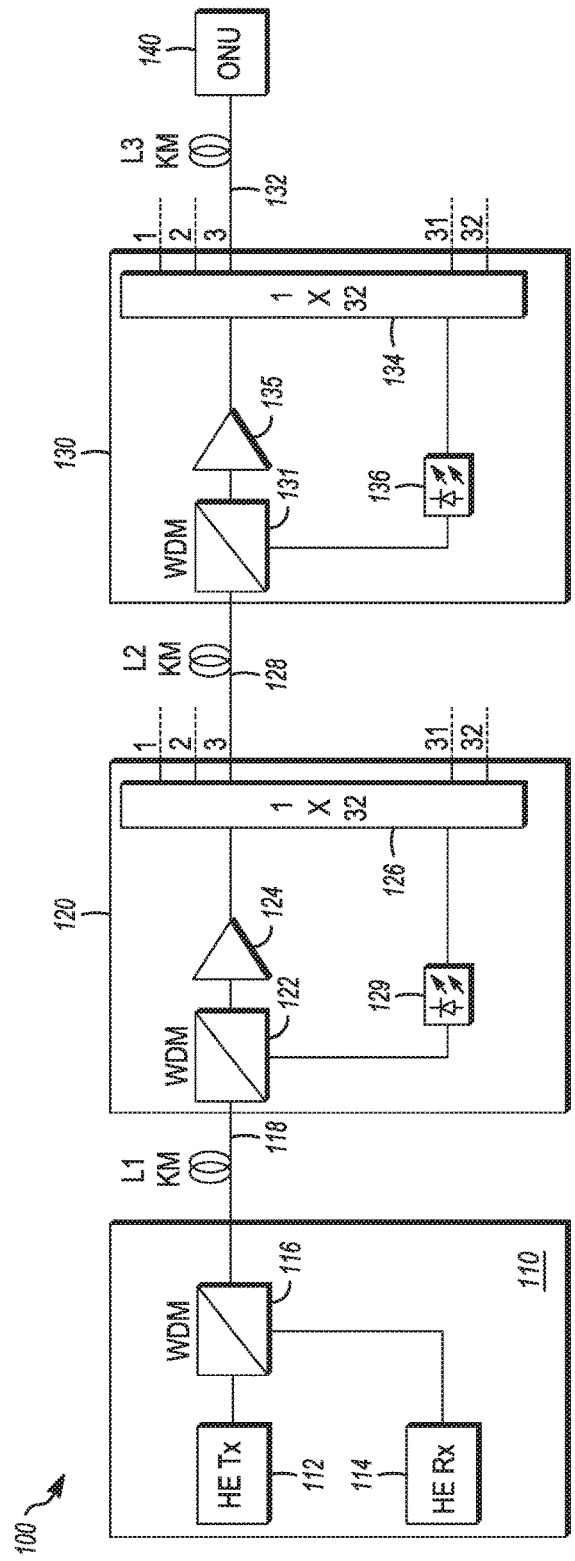
FIG. 2 shows an RFoG architecture improved in accordance with the disclosed techniques.

FIG. 2 illustrates an RFoG system with mixed active/passive splitters for delivering content, e.g., CATV content, to a plurality of subscribers over a network, such as the RFoG network.

Referring to FIG. 2, the architecture includes a head end 110 having a transmitter 112 and receiver 114, each connected to a WDM splitter 116 that outputs a signal to, and receives a signal from, a fiber link 118 of L1 km. The fiber link 118 is connected to an active splitter/combiner unit 120. The splitter/combiner unit 120 may include a WDM 122 that may separate forward path signals from reverse path signals. The forward path signal from the WDM 122 is provided to an EDFA 124 that outputs an amplified optical signal to an active 1×32 splitter 126 that has 32 output ports communicable to respective second fiber links 128. At each port, the power level is modest, in the 0-10 dBm range.

In the reverse direction, the 1×32 port splitter 126 operates as an active combiner 126, and includes, at each port, a WDM that directs upstream light to a detector at the port, which converts received optical signals to electrical signals, amplifies them in the RF domain, and provides the electrical signals to a transmitter 129 that outputs light at, for example, 1610 nm, 1310 nm, or some other appropriate wavelength, provided to the WDM 122, which in turn directs the upstream light into fiber 118. At the head end, the fiber 118 is connected to WDM 116 that directs the upstream light to the receiver 114.

Each of the 32 ports of the splitter/combiner 126 outputs, through a respective fiber 128, a respective downstream signal to a second active splitter/combiner unit 130, which may be of the same type and configuration as the splitter/combiner unit 120. The length(s) of the fiber 128 may vary with respect to each other. The output power per splitter port is low, around 0 dBm. The splitter ports are connected to ONUs 140, for instance in a Multiple Dwelling Unit (MDU) or a neighborhood, via fiber 132 of length L3. In a basic RFoG system, the sum of the fiber lengths L1+L2+L3 is up to 25 km. The system 100, however, will permit a higher total length of fiber between the head end and the ONUs, such as 40 km, because the system 100 can tolerate a higher SNR loss, as further described below.

The upstream signals from the ONU 140 may be individually terminated directly at the active splitter/combiner unit 130. Even for ONUs operating at 0 dBm, the power reaching the detectors is around −2 dBm (the fiber 132 is a short fiber up to a few km, and the WDM loss inside the active combiner is small). This is almost 20 dB higher than in existing RFoG systems, meaning that the RF levels after the detector in the splitter 134 is almost 40 dB higher than in existing RFoG systems. As a consequence, the receiver noise figure is not critical and high bandwidth receivers can be used with relatively poor noise performance. The received RF signal is re-transmitted via the transmitter 136 along the reverse path into fiber 128 and received and retransmitted by the preceding active splitter/combiner unit 120 and thereafter to the head end 110.

Figure 7:
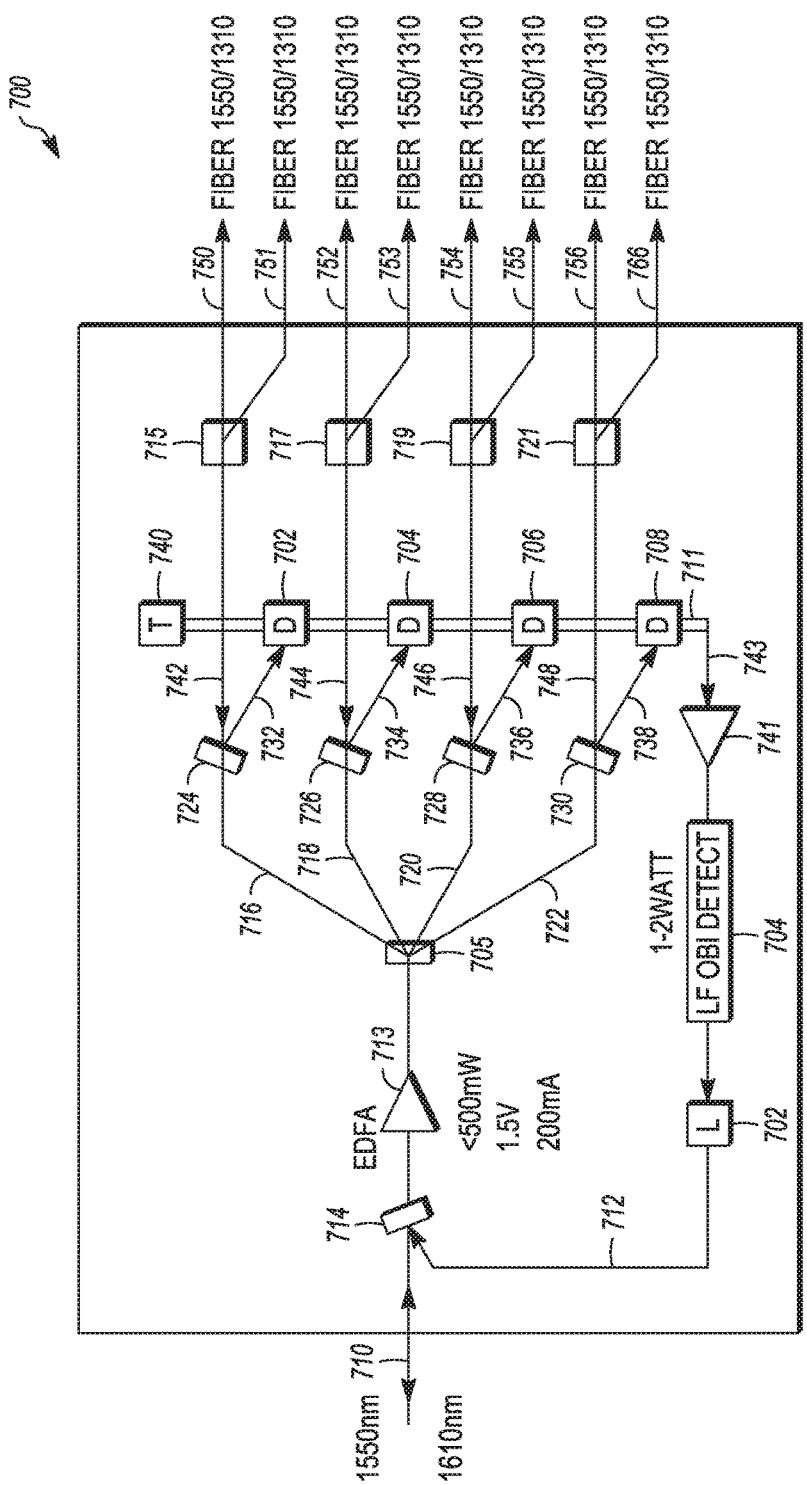
FIG. 7 illustrates integration of a transmission line receiver with wavelength division multiplexing (WDM) components.

Although the repeated re-transmission may lead to some incremental reduction in SNR, improvements in SNR from the active architecture provides much greater overall performance relative to traditional RFoG systems. More importantly, because all reverse signals may be individually terminated at separate detectors, such as a multiple detector receivers inside upstream active combiners 126 and 134 in the transmission line detector structure, there can be no optical beat interference (OBI) between different reverse signals. Referring ahead to FIG. 7 multiple detectors are depicted as a current source and capacitor in parallel.

In FIG. 2, the lasers 129, and 136 are reverse transmitting lasers. For instance, active combiner 134 in FIG. 2 is a unit with multiple photodetectors. The reverse signals are not combined optically, i.e., the reverse signals are individually detected and electrically summed in lasers 126/134, hence OBI cannot occur.

In the forward direction there may be multiple EDFAs, e.g., 124, 135. The EDFA may amplify the forward signal such that a high split ratio following the EDFA can be tolerated while still providing sufficient power to the next stage and/or end-users. For example, the active combiner disclosed herein offers such a good performance that the split ratio can be very high, so high that amplification of the forward signal becomes necessary. These EDFAs may be cost effective single stage devices with low power dissipation—typically 2 Watts or less. Cascading the EDFAs results in an accumulation of noise due to the finite noise figures of the EDFAs. Whereas the active splitter architecture does not require the EDFAs (the high power head end EDFA (not shown, but may be inserted after transmitter 112) could still be used to provide power to the ONUs 140), the use of EDFAs 124, 135 inside the active splitter units provides some advantages. For example, the complexity and power dissipation of equipment in the head end 110 is greatly reduced, as is the fiber count emanating from the head end 110. The amount of power delivered to the ONUs 140 is readily increased to approximately 0 dBm. As a consequence, ONU receivers obtain 12 dB more RF level from their detectors and do not need as high an SNR or gain. Even with relaxed SNR requirements at the ONU receivers, the SNR impact due to EDFA noise is easily overcome due to the higher received power. In addition, more RF spectrum can be supported in the forward direction with an acceptable SNR relative to current architectures, such as 4 GHz instead of 1 GHz in current RFoG. Hence total data throughput rates can grow significantly without a change in operation to permit for example, services that provide 40 Gbps download speeds and 10 Gbps upload speeds.

Embodiments for an RFoG combiner include preventing or eliminating OBI at the combiner as opposed to managing it at the extremities of the network (such as using a CMTS scheduler at the headend side of the network or wavelength specific ONUs at the subscriber end of the network). Embodiments are described that enable elimination of OBI. The disclosed optical combiner may be used to eliminate OBI, enhance capacity, and/or enable multiple services in RFoG, the cable version of FTTH networks.

Techniques for eliminating OBI, such as those described herein, are desirable, and may enable higher capacity in the upstream and downstream. For example, the optical combiner may enable OBI free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

The disclosed combiner and features of the combiner may enable RFoG coexistence alongside traditional HFC/D3.1 systems and future potential PON systems. The elimination of OBI is critical in some systems to unlock the vast potential of the optical fiber. The disclosed optical combiner may eliminate OBI, making a fundamentally OBI-free system. The optical combiner enables long reach and large splits, e.g., Up to 40 km and 1024 Splits, which will expand even further. The high upstream and downstream capacity enabled by the disclosed optical combiner includes up to 10G DS/1G US, and as high as 40G DS/10G US. In embodiments, the disclosed optical combiner prevents interference in RFOG deployments in the combiner, rather than preventing interference by measures taken in the ONU where previous attempts have failed or proven to be cost prohibitive.

The disclosed optical combiner may be independent of ONUs, Cable Modems and CMTSs. The disclosed optical combiner may be CMTS agnostic, thus relieving the burden of creating an RFoG aware scheduler that is both restrictive and time consuming. The optical combiner assists to make a cable version of FTTH more feasible, as compared to the PON alternatives. For example, in embodiments, the disclosed optical combiner has a reciprocal PON Pass thru capability of the optical combiner along with a high upstream and downstream capacity, which assists RFoG deployment without interruption to the underlaid system or impairment to future inclusion of PON functionality, such as later PON deployment on an RFOG system.

In some embodiments, the optical combiner such as those shown in FIGS. 1 and 2 provides upstream and downstream RFoG capability and a completely transparent and reciprocal avenue for PON transmission. The optical combiner may enable complete transparency for PON deployments. For example, the optical combiner may enable OBI free and high capacity features by deployment in compatible HFC D3.1 capable FTTH networks. Likewise, the optical combiner may be incorporated in to GPON, 1G-EPON, XGPON1, 10G/1G-EPON, 10G/10G-EPON. The compatibility with HFC and D3.1 enables the disclosed optical combiner to be deployed alongside a current HFC network, and is D3.1 ready. The optical combiner may be deployed on a fiber node, on multiple dwelling unit (MDU) and on single family home (SFU) deployments.

Figure 3:
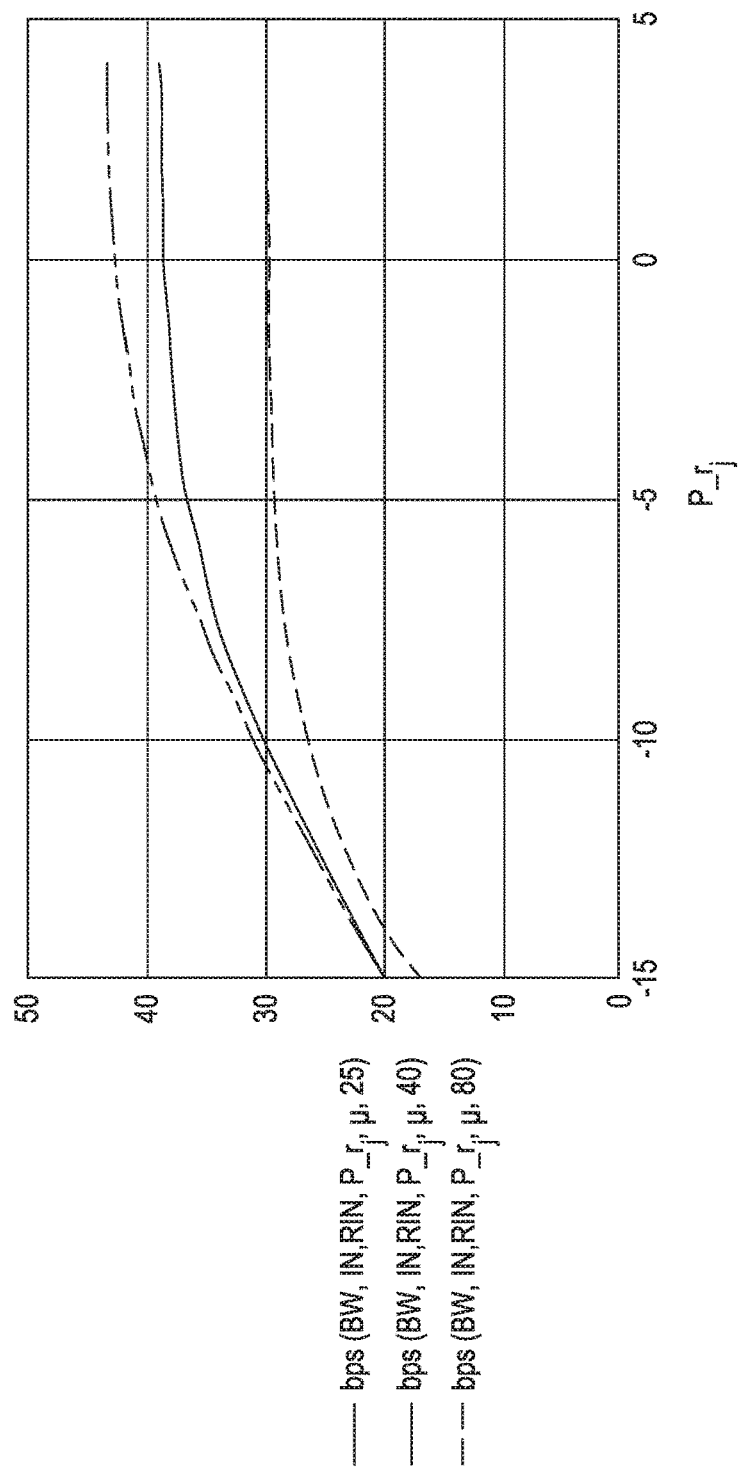
FIG. 3 illustrates a downstream data capacity theoretically attainable in an RFoG system with 4 GHz of forward bandwidth.

FIG. 3 illustrates the downstream data capacity theoretically attainable in an RFoG system with 4 GHz of forward bandwidth. For example, 40 Gbs downstream capacity can be obtained at a reasonable receive input power of 0 dBm in a system with a link length of 25 km (red). For link length of 40 km (blue) approximately 40 Gbs can still be obtained and still around 30 Gbs at 80 km. The amount of bandwidth available in an RFoG system may vary such that the available throughput can exceed or be less than these numbers. In the upstream at least 10% of that capacity should be available or 4 Gbs.

Disclosed herein are embodiments for an RFoG system with an extended downstream band, including embodiments for control of modem transit levels by a CMTS, application of FP lasers, and OBI control in mixed passive/active splitter systems. Described below are embodiments for a low cost RFoG system that can support downstream bandwidth growth to 40 Gbs and 10 Gbs upstream by using a photodetector and low-gain TIA with 4-7 GHz of bandwidth in combination with a 1 GHz upstream path. This results in approximately 4 GHz downstream and overlapping 1 GHz upstream bandwidth.

Figure 4:
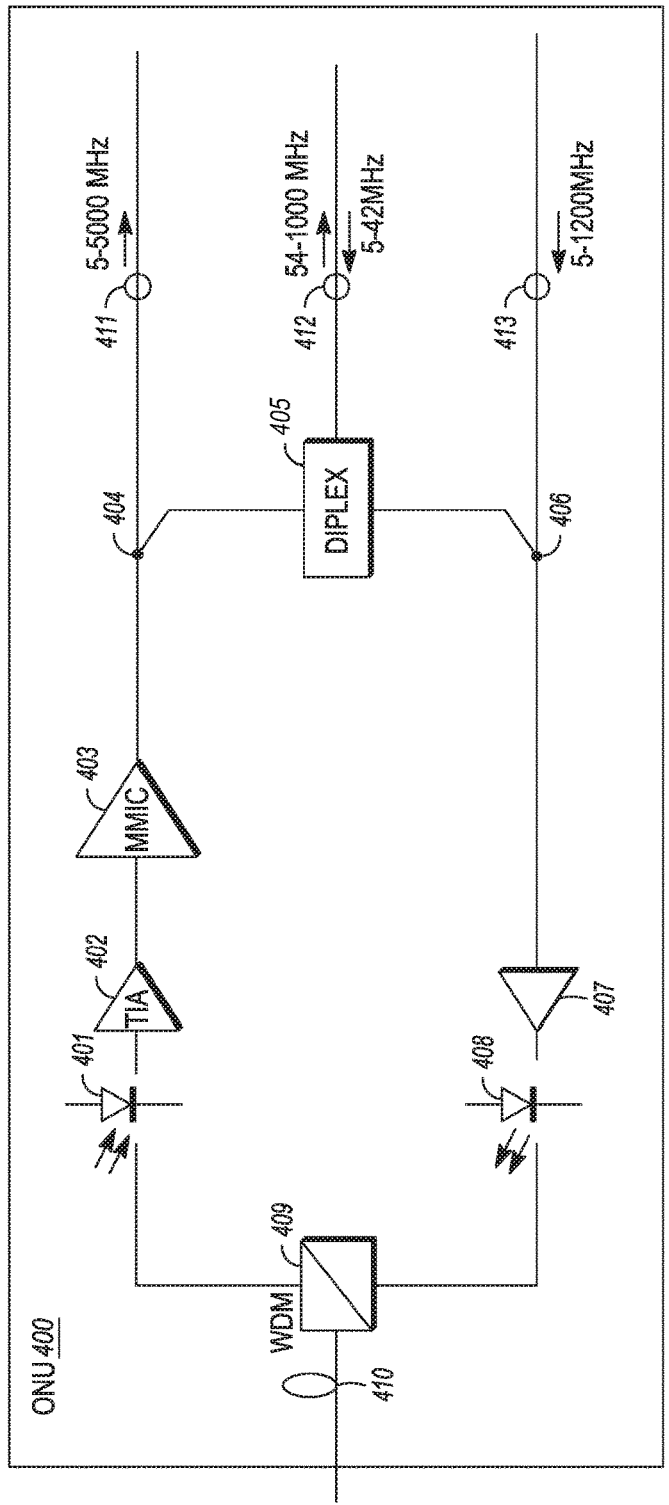
FIG. 4 depicts an ONU with a photo-detector and low-gain TIA for supporting bandwidth growth in an RFoG system.

FIG. 4 depicts an ONU 400 in an RFoG system that enables support in the RFoG system of a downstream bandwidth growth to 40 Gbs and 10 Gbs upstream by using a photo-detector and low-gain TIA. The ONU 400 connected to fiber 410 may be connected to a WDM 409 putting out light to a photodetector 401 with a trans impedance amplifier (TIA) 402. The TIA 402 may have around 4.7 GHz of bandwidth that can be used with a moderately worse noise figure than that of a conventional 1 GHz RFoG receiver. Subsequent RF amplification to 4 GHz or higher is readily available with low-cost commercial MMICs 403, such as that shown in FIG. 4.

The MMIC 403 output may be provided to a coupler 404 that couples a fraction of the signal to a diplex filter 405 and the rest to a coaxial output port 411 supporting output bandwidth, e.g., 5-5000 MHz of output bandwidth. However whereas in-home cabling exists for 4 GHz of bandwidth, often this bandwidth cannot readily be provided to the home coaxial network that is typically built for 1 GHz. Thus, port 411 may preferably not be connected directly to an in-home network. Instead coaxial port 412 may be connected to a diplex filter 405 that provides a 54-1000 MHz downstream signal to the in-home network and takes in a 5-42 MHz upstream signal from the home.

The diplex filter 405 separates the 5-42 MHz signal and directs it to coupler 406 that connects to amplifier 407 driving a laser 408. The laser 408 may output light to WDM 409 that directs the light to fiber 410 in upstream direction. The coupler 406 may also receive an input from a coaxial port 413 with a wide input bandwidth such as 5-1200 MHz. This wide input bandwidth for upstream signals may not be compatible with an in-home network wherein the bandwidth of 54-1000 MHz is already occupied in the downstream direction. For this reason, and because the in-home network may not support a 4 or 5 GHz downstream bandwidth, a base or holder is proposed that has a provision hold an ONU and an extended frequency range modem where the extended frequency modem can be inserted at a time when the extended frequency range is to be enabled. This embodiment may be beneficial both for forward and return (as will be discussed in more detail below).

Figure 5A:
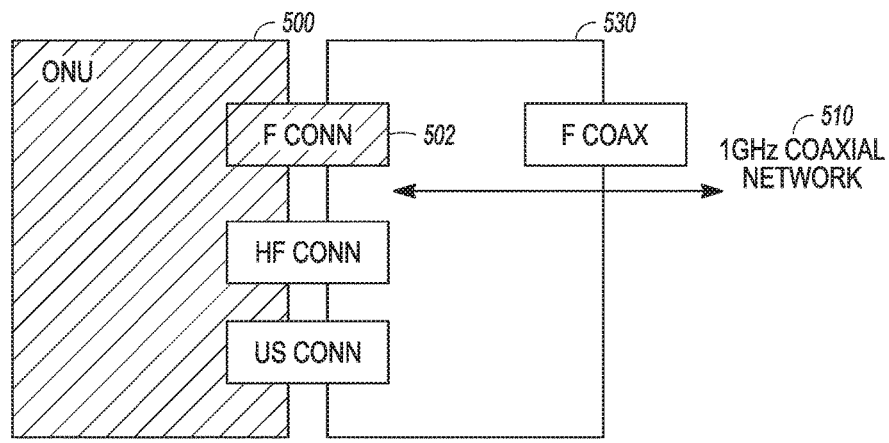
FIG. 5A depicts a conventional ONU with one coaxial connector connecting to an in-home network.

FIG. 5A depicts a conventional ONU 500 that has one coaxial connector 502 that connects to the in-home network via coax 510.

The ONU 500 has a band-limited bidirectional port 502 (corresponding to coaxial port 412 shown in FIG. 4) that works with the legacy RFoG frequency range (for instance 54-1000 MHz downstream and 5-42 MHz upstream as is typically used in the US CATV industry) and a split (for instance 42/54 MHz as is typically used in the US industry)

that is set as needed. This port connects to the 1 GHz home network and will provide sufficient bandwidth for 5-10 years.

As shown in FIG. 5A, the base holder 530 is a mechanical base large enough for an HF modem to be placed. The ONU 500 may also be placed in the base holder 530, or be otherwise connected for looping through the port 502 to the in-home network 510.

Figure 5B:
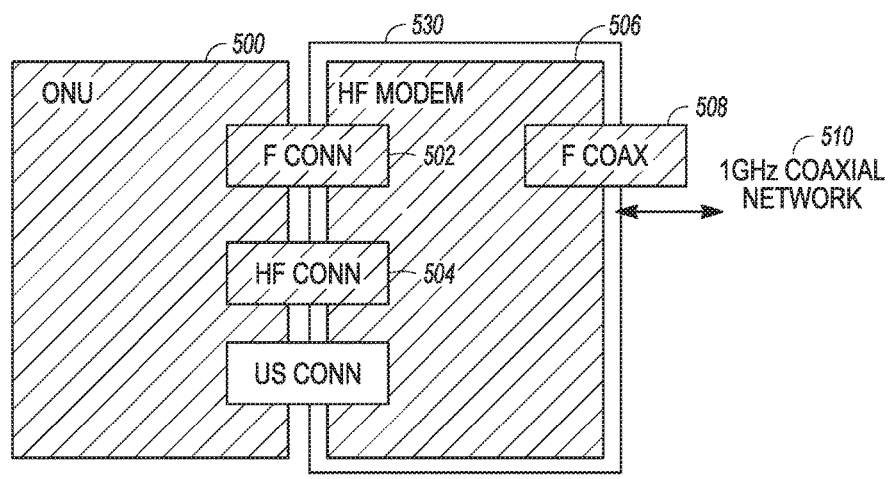
FIG. 5B depicts an ONU such as that in FIG. 5A but with additional connectors for high frequency upstream and downstream signals.

As shown in FIG. 5B, the ONU may have additional connectors for high frequency downstream signals (HF conn 504) and for high frequency upstream signals (US conn) corresponding to 411 and 413 in FIG. 4. When forward or reverse data capacity needs to be upgraded, then as shown in FIG. 5B a modem 506 may be inserted into the base 530 that connects to the high frequency connector (HF conn 504) and an optional upstream connector (US conn) (described in more detail below for FIG. 5C). In FIG. 5B, an HF modem 506 has been placed into the holder 530.

Figure 5C:
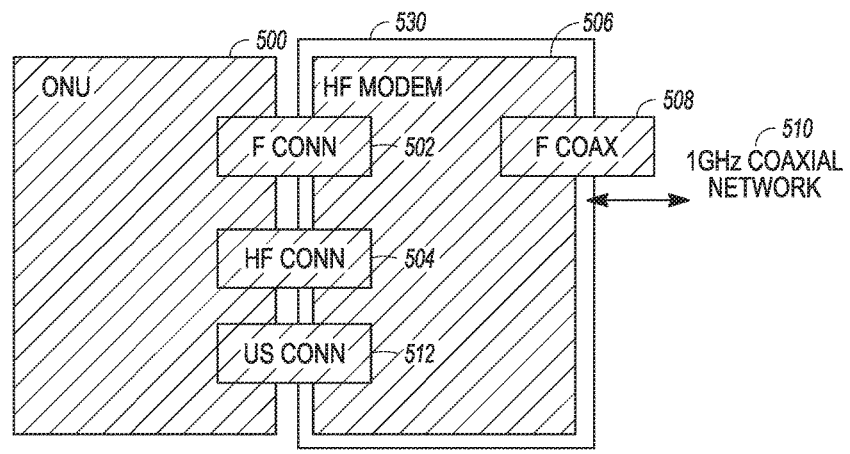
FIG. 5C depicts another embodiment of an ONU such as that in FIG. 5A, but with additional connectors for high frequency upstream and downstream signals.

As shown in FIG. 5C, the modem may directly connect to in home Ethernet or WiFi whereas the existing coaxial functions can be retained on the F coax connector that is passed through the modem to connector 508 to connect to in the in-home coaxial network 510. This implementation permits a low-cost ONU that terminates the fiber plant and provides capacity until the end of the next decade and beyond through a seamless transition. The primary difference to a conventional ONU is that two additional connectors are provided (HF conn 504 and US conn 512) that pass high frequency signals from the receiver and to the laser.

Figure 6:
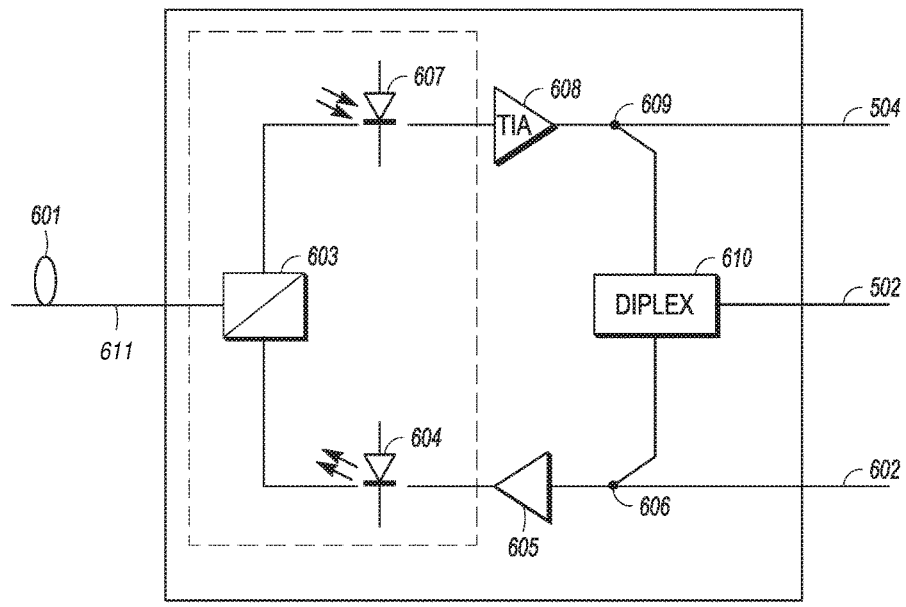
FIG. 6 depicts an ONU for expanding upstream and downstream bandwidths.

FIG. 6 depicts an ONU such as that shown in FIG. 5C, with fiber from the network (601) connected to the ONU at port 611 going to WDM 603 that passes upstream light to detector 607 607 and combines reverse light from laser 604, typically at a wavelength of 1610 or 1310 nm into the fiber to be transmitted in the upstream direction. It should be noted that in some implementations WDM 603, detector 607 and laser 604 can be implemented in one module.

The downstream signal is amplified by amplifier 608 and passes through a coupler 609 and port 504 and part of the signal to a diplex filter 610. The laser is driven by an amplifier 605 that receives input from a combiner 606 that gets input from a high bandwidth input port 602 and from the diplex filter 610. The diplex filter 610 is connected to the regular coaxial port 502 that supports traditional in-home coax networks.

The diplex filter 610 separates upstream traffic, for instance in the 5-42 MHz band such that it is put out to combiner 606. Downstream traffic, for instance in the 42-1000 MHz band from splitter 609 is put out at port 502. The difference between this ONU and a regular ONU is the presence of splitter 609, port 504, combiner 606 and port 602. A regular ONU provides a fixed bandwidth of for instance 5-42 MHz in the upstream direction and 54-1000 MHz in the downstream and is compatible with existing in-home coaxial networks.

The disclosed ONU provides a path around the diplex filter 610 for upstream signals on port 602 via combiner 606 and thus permits modulation of the upstream laser 604 with a much higher bandwidth, such as 1200 MHz. Unlocking this bandwidth increases the available upstream capacity more than ten-fold. Coupler 609 and port 504 provide an unfiltered path for high frequencies above 1000 MHz, typically not compatible with in-home networks, for instance in the 5-4000 MHz range to a modem. This can increase downstream capacity by a factor 2.4. Thus this new ONU is compatible with existing ONUs and in-home networks but through the addition of low cost components 609, 504, 606 and 602 it can support a large future growth in bandwidth. For current sub-GHz operation the ONU performs the same function as a regular ONU.

A high bandwidth receiver such as 607 with amplifier 608 can have a moderately worse noise figure than a low bandwidth receiver. Analog channels were conventionally used for transmitting CATV content (e.g., over channels; TV channels) before transmission of digital CATV content became available. The number of analog channels is gradually being reduced by cable providers. Analog channels required a higher SNR than digital channels and therefore required high transmit powers. As they are being removed, fewer channels can use up the available transmit power such that the modulation index per channel can be increased, thereby improving the signal to noise ratio, that is offset by a slightly worse receiver performance.

For a reduced analog channel load of 40 channels or less the CNR impact of a moderately worse receiver noise figure may be mitigated by a higher per-channel OMI of the analog channels and may not be as important. With an active splitter architecture the receiver power can readily be increased to −3 or even 0 dBm where the receiver noise figure does not matter anymore and the headend EFDAs are largely eliminated.

In some residential broadband data service delivery systems, there is a 42/54 MHz RF split; some countries use a 65/85 MHz split. The total data capacity in the upstream in these systems do not currently go beyond approximately 300 Mbps (calculated as bandwidth inMHz*bps/Hz, which is approximately 37 MHz*8 bps/Hz=300 Mbps). Embodiments of the disclosed RFoG systems can support such existing CATV plant functionality and can continue to support the in-home 1 GHz coaxial network with existing spilts, e.g., 42/54 MHz split, as bandwidth is upgraded. Bandwidth is upgraded with a modem directly connected to the ONU with express up- and down-stream RF ports; that can optionally be implemented as a gateway.

The disclosed RFoG system has an expanded downstream capacity. For example, existing 10G PON systems are unable to handle peak and average data traffic growth models that estimate a need for at least 30-40 Gbs for downstream traffic and a need for at least >5 Gbs upstream for upstream traffic capacity. The disclosed RFoG system provides a capacity for these target values, where embodiments disclosed have additional capacity in various implementations. The disclosed techniques may provide a more efficient use of the RF spectrum, which when used with RFoG technology and features available via the DOCSIS 3.1 standard—and combined with ONU designs using current technology—addresses the anticipated growth rates and bandwidth expansions seamlessly over the next decade and more.

In the above scenario, a change to how the ONU is built is to insert an RF combiner, in the upstream, with one of its RF input ports in between upstream laser RF driver and upstream RF diplex filter, and the other RF combiner input to serve as the 'broadband upstream' input, where signals up to ~300 MHz or even 1200 MHz can be immediately inserted for a greater US BW—provided the US laser, and US receiver, and US CMTS can utilize the bandwidth. A second change can be to include a splitter in the downstream path directing part of the signal to a diplex filter and part of the signal to an output port.

For embodiments with a new RFoG deployment, an 'broadband upstream' ONU, may be implemented with a 'standard' 42/54 MHz port, for those customers who would only require relatively limited level of DS/US BW. For customers that require a large bandwidth the downstream RF bandwidth can be opened up to ~4 GHz, and the upstream RF bandwidth up to ~1 GHz. At ~10 bps/Hz, those RF bandwidths, would yield 40 Gbps downstream/10 Gbps upstream capacity. Such an RFoG ONU could still be used in the standard 'narrow BW Upstream' applications, as well as with the 'broadband upstream'—by using the two RF inputs (802 and 902) enabled by addition of that upstream broadband RF combiner 906.

In the upstream, an RFoG system is not limited by the RF split of the CATV plant. Whereas the in-home coaxial network needs to be connected through a diplex filter to the ONU transmitter and receiver, the ONU transmitter can also be fed with a higher bandwidth signal. This is shown in FIG. 5C; if the HF modem is placed then the upstream connector 512 (US conn, also referred to as an express upstream port on the ONU) can provide a larger bandwidth signal to the upstream laser that bypasses the diplex filter.

As shown in FIG. 6, the upstream bandwidth can readily be increased to 1.2 GHz. An increase in the upstream bandwidth increases the upstream data rate to 4-10 Gbs depending on options chosen. There are many options to choose between that may modify the upstream bandwidth capacity, such as the use of an FP or DFB laser; laser power and the loss budget of the laser; a 12 dB dynamic window or no dynamic window (CMTS or modem level control); modulation index and whether it is adjusted for bandwidth or not; use PAPR (Peak to Average Power Reduction); use of an active or passive splitter; how many passive combines before and active splitter if used; implementations for OBI free operation; the number of transmitters on at the same time; and whether thermal noise from receivers adds up.

In embodiments, it is desirable that high-bandwidth RFoG return systems should not allow too many ONUs to be active at the same time. In such embodiments, ONUs active at the same time may be limited to 4 (or at most 32) reverse transmitters, i.e., ONUs, at any time. The CMTS modulation profiles should consider this to effectively use the available spectrum.

Some new control paradigms are preferred. In current RFoG systems a problem is that the CMTS sets the modem levels irrespective of the optical OMI on the transmitters involved. This is a legacy from how HFC plant had to be operated with varying and partly unknown loss budgets. In systems where the CMTS controls the reverse transmit level there is a significant uncertainty about the modulation index of optical transmitters because there are multiple loss factors (both optical loss and RF loss) in the system that are uncertain. As a consequence additional margin needs to be built in, a so-called dynamic window, such that the transmitter cannot be over-driven. The result is that the transmitter is generally under-utilized. In this scenario, it is proposed to have the optical OMI set by the transmitters (ONU or modem and ONU) following a fixed pattern. The fixed pattern may be set such that the transmitter OMI is always maximized such that the per-channel OMI increases when the spectrum out of the transmitter is narrower. When the modem and the ONU are coupled closely together then there is no uncertainty in optical loss between the modem and the ONU and thus the modulation index of the ONU can be accurately controlled by providing a correct drive level from the modem. The pattern may also be set such that the modulation index is a predetermined function of the amount of RF bandwidth that needs to be transmitted.

The dynamic window is now removed, because the modem directly adjacent to the ONU that is connected via the upstream express RF port can set an accurate modulation index on the ONU. This can be accomplished by calibration of the ONU and modem output levels such that an accurate OMI can be obtained. Alternately the modem can put out a reference signal to the ONU where the ONU reports the reference signal back to the modem such that the actual OMI can be determined or the ONU reports a measurement of the actual OMI back to the modem.

The spectral width to transmit is known both to the modem and to the CMTS that instructed the modem to adopt a particular profile. The CMTS can therefore be modified to predict the level changes and adjust accordingly as if the channel had a constant gain.

Disclosed are embodiments in which the CMTS can relinquish control of modem transmit levels. For example, in a 200 MHz RFoG return system, the CMTS may have to relinquish level control to the modem. In embodiments, such control is implemented directly next to the ONU as a gateway that retains an in-home 42/54 MHz split and 1 GHz coaxial network (and all modems and CPE that currently reside there), but may open up the rest of the return bandwidth for that high speed modem. The same high speed modem can also terminate the up-to 40 Gbs downstream services.

In embodiments, it is desirable that the CMTS should not have control, simply based on RF level presented to the CMTS, over high-speed modem modulation index in the extended bandwidth range. The modem should control the modulation index to optimally use the modulation index of the ONU transmitter based on the modulation profile provided by the CMTS. Alternately the CMTS can control the modulation index of the ONU transmitter in a way that sets a particular optical modulation index instead of simply an RF level into the CMTS port.

The control of the modulation index can be accomplished in one or more ways. In embodiments, the ONU may provide a reference signal at a known OMI that is monitored by the CMTS and where the CMTS also measures the RF level into the CMTS port from the ONU and compares this RF level to the RF level of the reference signal. The ONU may encode a signal reporting its actual modulation index. The CMTS may instruct the ONU or modem to pick one of a set of modulation indices matching various modulation profiles for each ONU transmission, the mechanism of instructing the ONU to pick a modulation index can work via the modem. The main difference is that the CMTS instructs modem or ONU to set a modulation index rather than to set an RF level of a transmission (which is the conventional way a CMTS controls upstream transmission RF levels) based on the RF level that the CMTS has received at an input port to the CMTS receiving an upstream signal.

Already the CMTS instructs modems when to transmit in the upstream direction and also sets the modem RF transmit level. In addition the CMTS can instruct modems at what RF level to transmit on a burst per burst level in accordance with the modulation profile chosen. Provided that this results in a known OMI from the ONU the CMTS could still control the RF level of the modem such that a desired OMI is obtained from the ONU. This could be accomplished by having a calibrated OMI response to an RF level from the modem or by other means as outlined above.

In a preferred embodiment where the upstream transmitting modem is co-located or located near to the ONU, such as in a gateway, the RF loss between modem and ONU is low and such a calibration can be reliable. Furthermore for such a co-location other signals may also easily be passed between ONU and modem such that the modem can receive signals from the ONU reporting actual OMI and status.

Finally such co-location or other means as mentioned above to accurately set OMI are preferably used to eliminate the set-up margin, the so-called dynamic window, typically used in return systems to accommodate set-up uncertainty.

Removal of the dynamic window margin results in improved SNR. Removal of this margin can have the unwanted effect of also eliminating margin to ingress; ingress is unwanted RF signals coupled into the return path that cause high OMI of the lasers driving lasers into clipping, where the clipping induces wideband noise not only affecting the ONU in question but also affecting the reception of other transmitting ONUs. This can be mitigated by suppressing OMI on ONUs with excessive OMI, accomplished by monitoring the RF power input to the ONU and increasing ONU attenuation in case that RF power is above a set level, where that set level corresponds to the maximum OMI that can be expected in a system with a well-controlled OMI as proposed here. Furthermore the preferred co-location of wide bandwidth upstream modem and ONU prevents coupling of such unwanted RF signals into the input of ONU such that ingress becomes unlikely.

FIG. 7 illustrates an active splitter with mixed passive/active splitters for OBI mitigation, integrated with a transmission line receiver 740. The transmission line receiver is shown with wavelength division multiplexing (WDM) components 724, 726, 728, 730, with micro-optics splitting the 1610 nm light from fibers 750, 752, 754, 756 with 1550 nm light in the downstream and 1610 nm light in the upstream and directing it to detectors (D) 702, 704, 706, 708.

It is noted that splitters 126 and 134 depicted in FIG. 2 correspond to the splitter depicted in FIG. 7, where WDM 714 in FIG. 7 corresponds to the WDM 122, 131 shown in FIG. 2. FIG. 7 illustrates the internal splitter 126, 134 components. Output 712 in FIG. 7 corresponds to the output between WDM 122 and laser transmitters 129 of combiner 120 and/or between WDM 131 and laser transmitter 136 of combiner 130.

FIG. 7 depicts an active splitter 700 with detectors 702, 704, 706, 708 connected via the transmission line 711 with termination 740. Light 710 may be input to the active splitter 700 from a headend as shown as light input at 1550 nm. The active splitter 700 may propagate light forward over fibers 750, 752, 754, 756 to a plurality of ONUs. Light 710 may be received at the active splitter 700 from a CMTS. The light 710 enters WDM 714 and may be provided to EDFA 713 feeding a splitter 705 that splits the signal in a plurality of ways by a passive splitter 705, which exists at the junction of fibers 716, 718, 720, 722. The splitter 705 provides light to a plurality of WDMs 724, 726, 728, 730 over the fibers 716, 718, 720, 722, respectively. Outputs 750, 752, 754, and 756 from each of the WDMs 724, 726, 728, 730 may be transmitted over fibers 750, 752, 754, and 756, respectively, to a subsequent active splitter or ONU.

Note the passive splitters 715, 717, 719, 721 to the right in FIG. 7 that may be used to provide additional output fibers 751, 753, 755, 766. The passive splitters may induce loss at the ports to the detectors 702, 704, 706, 708 and cause OBI, but reduce the cost of detectors and WDMs required per port. A LF OBI detect circuit 704 may be added for signaling based on OBI detection and for providing a signal to a return laser 702. If the splitters 715, 717, 719, 721 are not used then there is no OBI and the OBI detect circuit 704 is not needed. In embodiments, the return wavelength may be shifted to 1610 nm, as shown in FIG. 7, or 1310 nm.

The output fibers 750, 752, 754 and 756 respectively also provide upstream signals to WDMs 724, 726, 728 and 730 at a wavelength different from the downstream wavelength such as at 1610 nm so that WDMs 724, 726, 728 and 730 can selectively direct these wavelengths to detectors 702, 704, 706 and 708 connected via transmission line 711 from termination 740 to an output 743, which may be transmitted to the amplifier 741. The detectors are an integral part of the transmission line 711 from termination 740 to the output 743, which may be transmitted to the amplifier 741. Thus the transmission line 711 consists of sections of transmission line with matching components including the detectors 702, 704, 706 and 708 and provides a signal representative of the sum of the delayed detector currents to amplifier 741 that drives a reverse laser 702.

Light 712 may be provided by a reverse laser 702 in the splitter 700, as described in more detail below. Light 712 may be from a laser located at active splitter 700 location, the light directed towards the CMTS or other light source preceding the active splitter's WDM 714. In particular, the transmission line 711 may have an output 743 with signal from the coaxial line 711, where output 743 represents the sum of the outputs from the detectors along the transmission line. The signal at output 743 may be amplified by amplifier 741, transmitted by laser 702 and returned inside the active splitter 700 at input 712 to WDM 714, where input 712 may be reserved for reverse laser transmitting upstream the information received from the transmission line detector structure. In particular, the signal at output 743 may be amplified by amplifier 741 and output to an LF OBI detector 704.

The LF OBI detector 704 may use a lower 5 MHz band to detect out of band noise created by the OBI. When the OBI occurs the return laser (L) 702 may be modulated with a low frequency carrier (or an existing LF carrier is phase modulated) and a fraction of that signal may pass through the EDFA 713 into the forward path. This carrier can be in the 500 kHz-4 MHz range. Such a signal may be readily detected by the ONU with low-cost means and the ONU can take action if needed by shifting its wavelength in case it was involved in an OBI event. From the return laser 702, optical input 712 may enter WDM 714 and then reflects the wavelength into fiber 710 for carrying the optical signal to the CMTS. Thus, upstream information detected by the transmission line structure that included the detectors may be relayed to the CMTS. To relay the upstream information detected by the transmission line structure, the information may be transmitted to the CMTS via 712, WDM 714 and then over fiber 710.

The other side of the transmission line may be terminated at termination 740, internal to the active splitter, or this is also brought out such that blocks, i.e., units of 740, can be cascaded. For example, when cascaded termination T (740) is removed and connected to coax output (743) of a preceding block 700 two or more multiple blocks 700 can be cascaded where only the first one needs a termination T (740) resulting in one output (743) that represents the delayed sum of all the photo-detector currents.

The WDM components 714, 724, 726, 728, 730 could be replaced by 10/90 splitters (90% to keep main path loss low), the resulting SNR then drops to a level comparable to a conventional system. The cost saving is TBD because the WDM implementation such as that disclosed and shown in FIG. 7 allows a drop in ONU power or the use of lower performing FP (Fabry-Perot) lasers potentially resulting in greater savings.

As disclosed herein when bandwidth is extended (e.g., when a cable operator/system expands a system bandwidth when needed for transmissions) the SNR of channels under 1 GHz drops. With the active splitter the reduced SNR may be mitigated a priori because additional SNR margin is built in (e.g., the active splitter architecture described above provides for a greater SNR as compared to regular RFoG or HFC systems without the active splitter concept incorporated). Without the active splitter it can still be argued that by the time that forward spectrum is extended to 2 GHz or more the HF modem will be used and amplitude modulated vestigial side band (AM-VSB) is likely limited to very few channels or none. Thus, as the use of analog channels is being reduced, the result is a sufficient budget to off-set the modulation index used by the additional QAM channels without over-driving the laser.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

EMBODIMENTS

An RFoG system where the reverse transmit modem level is set to obtain a precise optical modulation index on the reverse transmitter.

As above where the CMTS adjusts the optical modulation index in response to a modulation profile.

As above where the CMTS adjusts the modulation index of an ONU in response to a modulation profile on that ONU and at least one modulation profile of at least one other ONU transmitting to the same CMTS upstream RF port.

As above where a modem sends an RF signal to an ONU that has a calibrated RF level that responds with a calibrated modulation index As above where the CMTS does not control modulation index and instead the modem and ONU control modulation index As above where the modem and ONU control modulation index in response to the modulation profile to be transmitted. Here modulation profile means one or more of the following aspects: RF frequency spectrum occupied by the transmission, RF level being provided to transmitter, modulation format being transmitted and SNR or optical modulation index required for such transmission.

As above where the ONU reports a modulation index to a modem or to a CMTS

As above where the ONU embeds a reference signal in transmissions to a CMTS with a known optical modulation index.

As above where the effective modulation index is set higher for signals with PAPR (Peak to Average Power Reduction) than for signals without PAPR.

As above where an active splitter/combiner is used and the CMTS maximizes the optical modulation index of the reverse transmitter in the active splitter combiner that transmits the combined detected signals of one or more ONUs that may be active. This function optimizes signal to noise ratio at all times considering the combined signals being handled by the active splitter/combiner.

An RFoG system with an ONU and a gateway located near the ONU where the gateway is optionally placed to enhance bandwidth and the gateway handles conventional RFoG signals in the upstream and downstream direction in addition to RFoG signals in an extended spectrum with a frequency range larger than that for conventional RFoG operation. Conventional RFoG operation is defined as operation in frequency bands matching those on HFC plant, such a 5-42 MHz for upstream and 54-1000 MHz for downstream traffic As above where ONU and gateway are co-located As above where the ONU is fixed or part of a mechanical base that permits placement of the gateway in that base at a later time As above where ONU and gateway connectors are normalized and mate when the gateway is placed in the base and the gateway is inter-changeable to upgrade bandwidth As above where extended spectrum RFoG signals include overlapping frequency ranges for upstream and downstream traffic As above where, in addition to a conventional bidirectional connector for conventional RFoG traffic, the ONU has an express port for upstream traffic operating in an extended bandwidth, optionally matched by an express port for upstream traffic on the gateway As above where the ONU has an additional dedicated express high frequency downstream connector carrying signals above 1 GHz, preferably up to 4.7 GHz As above where the gateway passes through bi-directional signals in the conventional RFoG band As above where the gateway processes signals on the express ports and provides a digital interface such as Ethernet or WiFi in addition to RF signals on the conventional signal port As above where the gateway not only passes but also interprets and processes signals on the conventional signal RF port.

An RFoG receiver with at least 1.2 GHz of downstream bandwidth and upstream bandwidth overlapping with downstream bandwidth including at least one bidirectional RF port with non-overlapping upstream and downstream bandwidth and at least one additional RF port As above with at least 4 GHz of downstream bandwidth As above where an RF power amplifier is used for in-home distribution and PAPR methods are used in the forward transmission format to reduce the power dissipation of that amplifier.

A system with an RFoG receiver as above with active splitters providing at least −6 dBm of receiver power and preferably up to 0 dBm of receiver power.

We claim:

1. A radio frequency over glass (RFoG) system comprising:
    a wave division multiplexer (WDM) capable of receiving an upstream optical signal from a headend;
    a splitter for splitting the upstream optical signal, the signal remaining in an optical domain;
    an optical network unit (ONU) connected to the splitter;
    a cable modem termination system (CMTS) connected to the splitter, wherein the CMTS adjusts and maximizes an Optical Modulation Index (OMI) of a reverse transmitter modem in the splitter that transmits combined detected signals to the ONU in the RFoG system;
    a gateway including the modem connected to the ONU having an express upstream port for providing upstream signals including extended range signals in an extended spectrum to the ONU,
    wherein the gateway is configured for processing legacy RFoG signals in an upstream direction and for at least one of generating or processing, via the express ports on the modem, RFoG signals in the extended spectrum beyond 42 MHz in the upstream direction; and
    wherein the modem is located directly adjacent to the ONU to provide accurate OMI control, the modem connected to the ONU via the upstream RF port, the gateway configured to set the accurate OMI on the ONU by calibrating output levels of the ONU and the modem.

2. The RFoG system of claim 1, wherein the CMTS adjusts the optical modulation index of the ONU in response to a modulation profile on said ONU and at least one modulation profile of at least one other ONU transmitting to a same CMTS upstream RF port.

3. The RFoG system of claim 1, wherein the modem sends a radio frequency (RF) signal to the ONU, the ONU having a calibrated RF level that responds with a calibrated optical modulation index.

4. The RFoG system of claim 1, wherein the modem and the ONU control the OMI without input from the CMTS.

5. The RFoG system of claim 1, wherein a precise optical modulation index enables an upstream bandwidth of up to 10 Gbps.

6. The RFoG system of claim 1, wherein the modem and ONU control the optical modulation index in response to a modulation profile to be transmitted.

7. The RFoG system of claim 6, wherein the modulation profile is at least one of the following: an RF frequency spectrum occupied by a transmission, an RF level being provided to the reverse transmitter, a modulation format being transmitted, a signal to noise ratio (SNR), or an optical modulation index required for transmission.

8. The RFoG system of claim 1, wherein the modem includes one or more reverse transmitters in the RFoG system for setting the OMI to a reverse transmit modem level following a fixed pattern.

9. The RFoG system of claim 8, wherein the fixed pattern maximizes the optical modulation index of the one or more reverse transmitter, increasing the optical modulation index per-channel when a spectrum out of a respective one or more reverse transmitter is narrowed.

10. The RFoG system of claim 1, wherein the modem puts out a first reference signal to the ONU, the ONU reports a second reference signal to the modem in response to the first reference signal, and the modem determines the optical modulation index based on the second reference signal.

11. The RFoG system of claim 1, wherein a per channel optical modulation index (OMI) is adjusted for a plurality of ONUs as a function of a spectral width of a signal provided to each of the respective plurality of ONU, wherein the spectral width of the signal is known to both the modem and the CMTS that instructs the modem to adopt a particular modulation profile.

12. The RFoG system of claim 1, wherein the ONU reports a modulation index to the modem or to the cable modem termination system (CMTS).

13. The RFoG system of claim 1, wherein the ONU embeds a reference signal in transmissions to the cable modem termination system (CMTS) with a known optical modulation index.

14. The RFoG system of claim 1, wherein the optical modulation index is set higher for signals with a Peak to Average Power Reduction (PAPR) than for signals without PAPR.

15. The RFoG system of claim 1, wherein legacy RFoG signals are signals operating in frequency bands matching those on a hybrid fiber coax (HFC) system, the frequency bands covering 5-42 MHz for upstream traffic and 54-1000

MHz for downstream traffic and these signals are provided on a connector separate from the express upstream or downstream connector.

16. The RFoG system of claim 1, wherein at least one of: the ONU is adapted to receive the modem having the express RF ports for the extended RF spectrum, or the modem is adapted to receive the ONU having the express RF ports for the extended RF spectrum.

17. The RFoG system of claim 1, wherein ONU and gateway connectors are normalized and mate when the gateway is placed in a base also connected to the ONU, the gateway being interchangeable for modifying bandwidth capabilities of the ONU.

18. The RFoG system of claim 1, wherein the extended spectrum RFoG signals include overlapping frequency ranges in the upstream and downstream traffic.

19. The RFoG system of claim 1, wherein the ONU comprises:
a band-limited bidirectional connector for the legacy RFoG signals; and
an express port for upstream traffic operating in an extended bandwidth matched by the express port for upstream traffic on the gateway.

20. The RFoG system of claim 1, wherein the modem's express upstream port provides a larger upstream bandwidth using an upstream laser and bypassing a diplex filter in the ONU.

21. The RFoG system of claim 1, wherein the ONU has an additional dedicated express high frequency downstream connector carrying signals above 1 GHz.

22. The RFoG system of claim 1, further comprising an RF power amplifier for in-home distribution, the RF power amplifier using PAPR in a forward transmission format for reducing power dissipation of the RF power amplifier.

23. The RFoG system of claim 1, wherein the gateway provides a digital interface for at least one of an Ethernet or WiFi connection.

* * * * *